US006231161B1

(12) United States Patent
Saruta

(10) Patent No.: US 6,231,161 B1
(45) Date of Patent: May 15, 2001

(54) DOT RECORDING FOR PREVENTING ADJACENCY OF RECORDING POSITIONS

(75) Inventor: Toshihisa Saruta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/460,422

(22) Filed: Dec. 14, 1999

(30) Foreign Application Priority Data

Dec. 24, 1998 (JP) .................................................. 10-366403

(51) Int. Cl.⁷ ................................. B41J 2/21; B41J 29/38
(52) U.S. Cl. .................................... 347/43; 349/12; 349/9
(58) Field of Search .................................. 347/9, 40, 12, 347/16, 43

(56) References Cited

U.S. PATENT DOCUMENTS

| 4,198,642 | 4/1980 | Gamblin | 347/41 |
|---|---|---|---|
| 5,359,355 | * 10/1994 | Nagoshi et al. | 347/9 |

FOREIGN PATENT DOCUMENTS

| 53-2040 | 1/1978 | (JP) . |
| 4-19030 | 3/1992 | (JP) . |
| 9-11509 | 1/1997 | (JP) . |

* cited by examiner

*Primary Examiner*—Thinh Nguyen
(74) *Attorney, Agent, or Firm*—Oblon, Spivak, McClelland, Maier & Neustadt, P.C.

(57) ABSTRACT

Dot recording technique is provided to relieve deterioration of image quality due to ink blot or deviation of dot density. Recording positions on each pass of main scan are set so that the dot recording positions for an identical color appear once every s dots in a main scanning direction on each raster line where s is an integer of at least 5. A sub-scan feed amount after each pass and the dot recording positions on each pass of the main scan are set so that the dot recording positions on any two consecutive passes are separated from each other.

12 Claims, 18 Drawing Sheets

Fig. 5(A) ARRANGEMENT OF NOZZLE ARRAYS
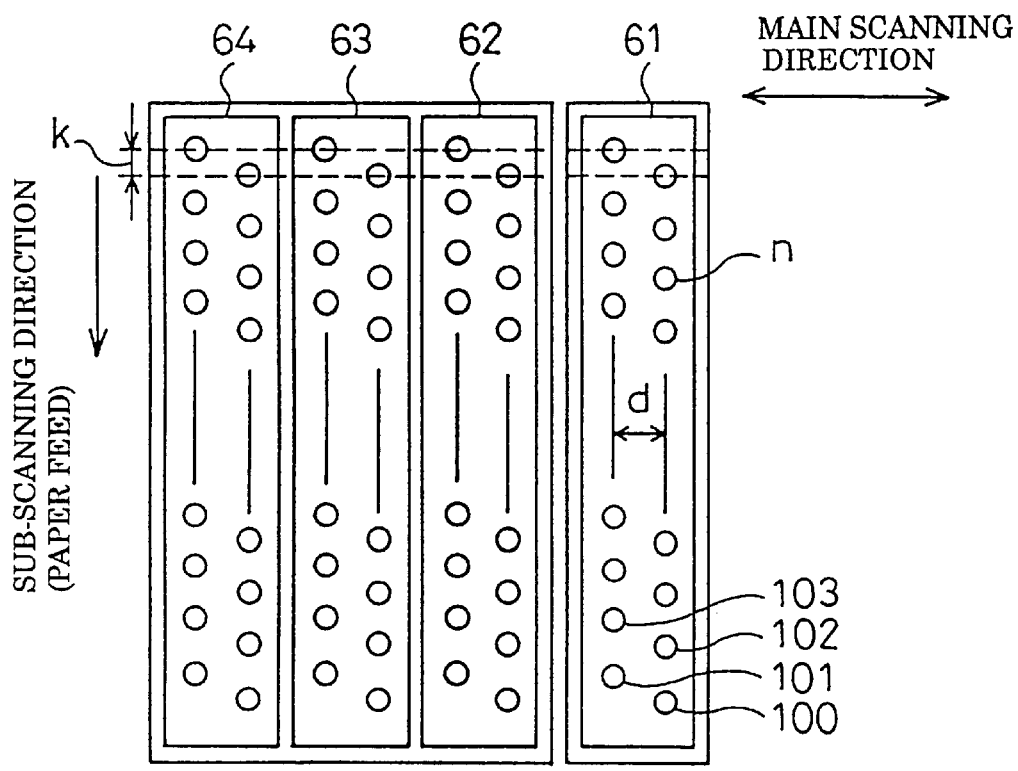
Fig. 5(B) DOTS FORMED BY ONE NOZZLE ARRAY
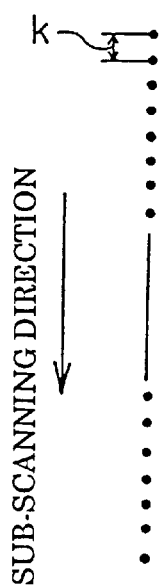

Fig. 6(A) CONCEPT OF SUB-SCAN FEED (s=1)
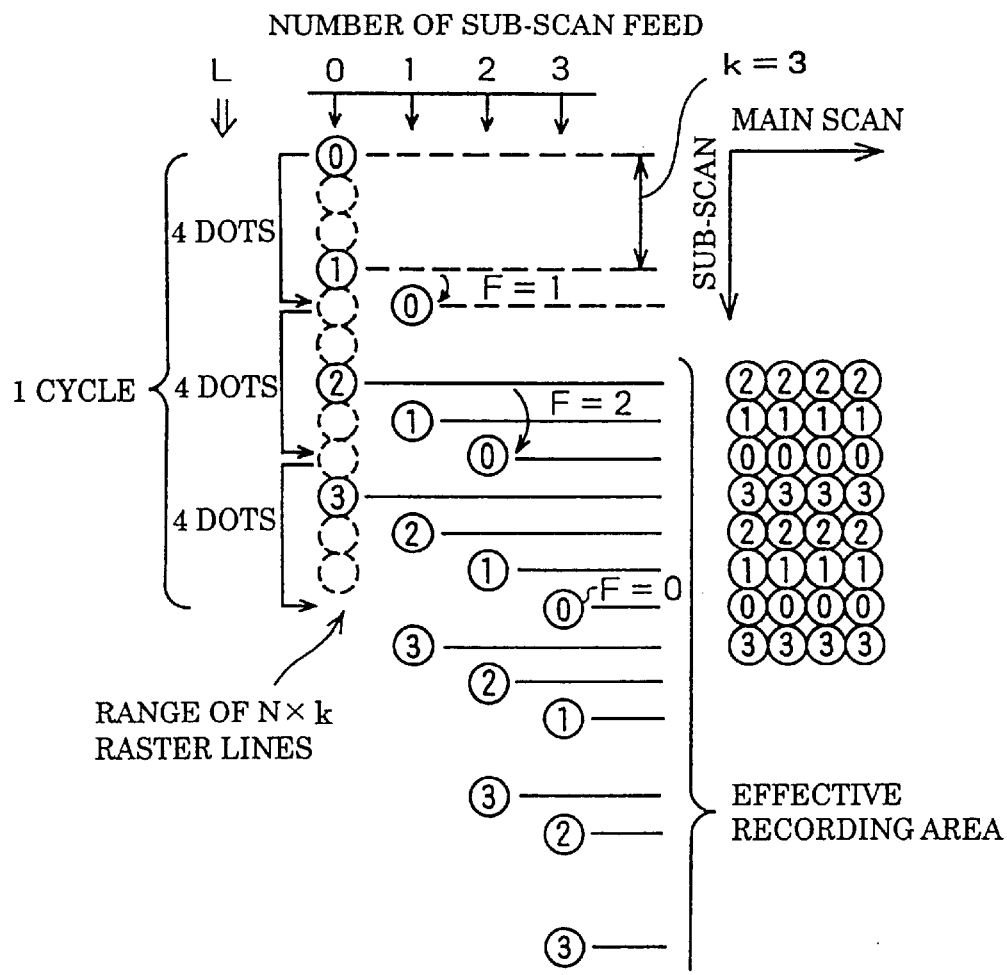
Fig. 6(B) PARAMETERS
NOZZLE PITCH k : 3 [dot]
NUMBER OF USED NOZZLES N : 4
NUMBER OF SCAN REPEATS s : 1
NUMBER OF EFFECTIVE NOZZLES Neff : 4
| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F = (ΣL) % k | 0 | 1 | 2 | 0 |

Fig. 7(A) CONCEPT OF SUB-SCAN FEED (s=2)
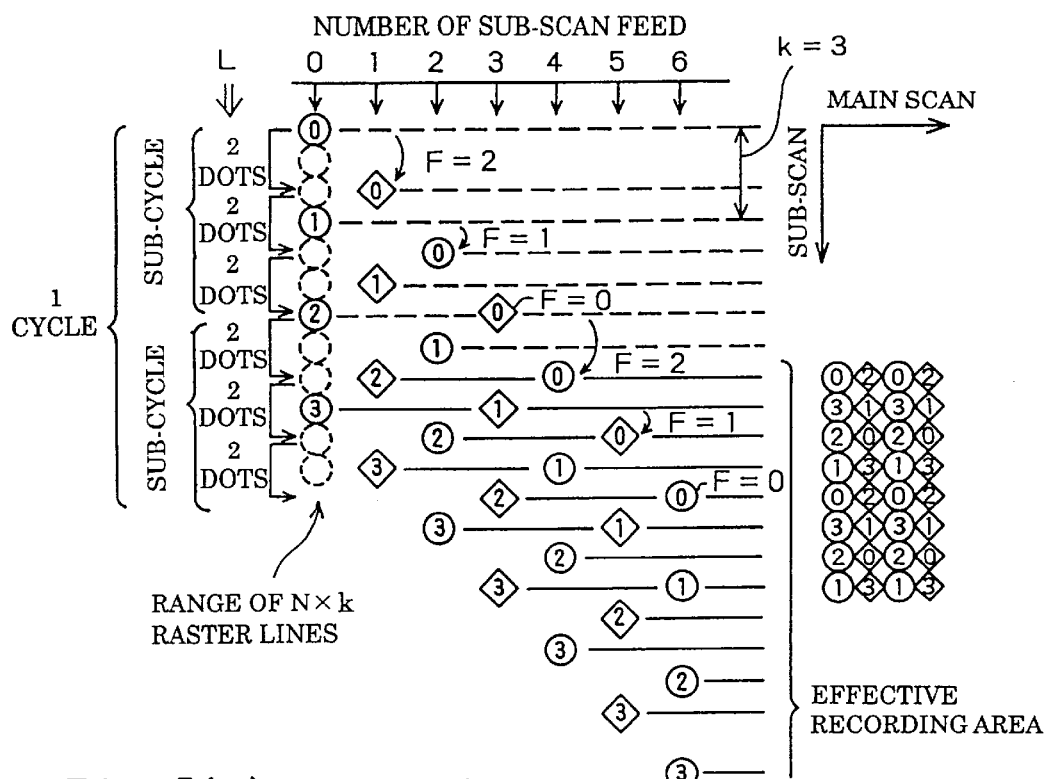
Fig. 7(B) PARAMETERS
NOZZLE PITCH k : 3 [dot]
NUMBER OF USED NOZZLES N : 4
NUMBER OF SCAN REPEATS s : 2
NUMBER OF EFFECTIVE NOZZLES Neff : 2
| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| ΣL | 0 | 2 | 4 | 6 | 8 | 10 | 12 |
| F = (ΣL) % k | 0 | 2 | 1 | 0 | 2 | 1 | 0 |

Fig. 8

SCAN PARAMETERS OF FIRST EMBODIMENT

Nozzle pitch : k = 4 [dots]
Number of scan repeats : s = 8
Number of used nozzles : N = 24
Number of effective nozzles : Neff = 3

| PASS No. | 1 | 2 | 3 | 4 | 5 | 6 | 7 | 8 | 9 |
|---|---|---|---|---|---|---|---|---|---|
| SUB-SCAN No. | 0 | 1 | 2 | 3 | 4 | 5 | 6 | 7 | 8 |
| FEED L [dots] | - | 3 | 3 | 3 | 3 | 3 | 3 | 3 | 3 |
| $\Sigma$L | - | 3 | 6 | 9 | 12 | 15 | 18 | 21 | 24 |
| F=($\Sigma$L)%k | - | 3 | 2 | 1 | 0 | 3 | 2 | 1 | 0 |
| PIXEL POSITION | %1 | %4 | %7 | %2 | %5 | %8 | %3 | %6 | %4 |
| SHIFT $\Delta$% | - | 3 | 3 | 3 | 3 | 3 | 3 | 3 | 6 |

Fig. 9

FIRST EMBODIMENT (RASTER LINE NUMMBER SERVICED BY EACH NOZZLE)

| PASS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| PIXEL SHIFT | %1 | %4 | %7 | %2 | %5 | %8 | %3 | %6 | %4 | %7 | %2 | %5 | %8 | %3 | %6 | %1 | %7 | %2 | %5 | %8 | %3 | %6 | %1 | %4 | %2 | %5 | %8 | %3 | %6 | %1 | %4 | %7 |
| NOZZLE | - | 3 | 3 | 3 | 3 | 3 | 3 | 3 | 6 | 3 | 3 | 3 | 3 | 3 | 3 | 3 | 6 | 3 | 3 | 3 | 3 | 3 | 3 | 3 | 6 | 3 | 3 | 3 | 3 | 3 | 3 | 3 |
| #1 | | | | | | | | | | | | | | | | | | | | | | | | | | | | | | | | |
| #2 | | | | | | | | | | | | | | | | | | | | | | | | | | | | | 1 | 1 | 1 | 4 |
| #3 | | | | | | | | | | | | | | | | | | | | | | | | | | | | 1 | 1 | 2 | 5 | 8 |
| #4 | | | | | | | | | | | | | | | | | | | | | | | | | 1 | 2 | 5 | 6 | 3 | 6 | 9 | 12 |
| #5 | | | | | | | | | | | | | | | | | | | | | 1 | 1 | 1 | 1 | 3 | 6 | 9 | 12 | 7 | 10 | 13 | 16 |
| #6 | | | | | | | | | | | | | | | | | | 1 | 1 | 1 | 3 | 2 | 5 | 4 | 7 | 10 | 13 | 16 | 11 | 14 | 17 | 20 |
| #7 | | | | | | | | | | | | | | | 1 | 1 | 3 | 2 | 5 | 4 | 7 | 6 | 9 | 8 | 11 | 14 | 17 | 20 | 15 | 18 | 21 | 24 |
| #8 | | | | | | | | | 1 | 2 | 5 | 4 | 7 | 6 | 9 | 8 | 11 | 10 | 13 | 12 | 15 | 14 | 17 | 16 | 19 | 22 | 25 | 28 | 23 | 26 | 29 | 32 |
| #9 | | | | | 3 | 2 | 5 | 4 | 7 | 6 | 9 | 8 | 11 | 10 | 13 | 12 | 15 | 14 | 17 | 16 | 19 | 18 | 21 | 20 | 23 | 26 | 29 | 32 | 27 | 30 | 33 | 36 |
| #10 | | | 1 | 4 | 7 | 6 | 9 | 8 | 11 | 10 | 13 | 12 | 15 | 14 | 17 | 16 | 19 | 18 | 21 | 20 | 23 | 22 | 25 | 24 | 27 | 30 | 33 | 36 | 31 | 34 | 37 | 40 |
| #11 | | | 5 | 8 | 11 | 10 | 13 | 12 | 15 | 14 | 17 | 16 | 19 | 18 | 21 | 20 | 23 | 22 | 25 | 24 | 27 | 26 | 29 | 28 | 31 | 34 | 37 | 40 | 35 | 38 | 41 | 44 |
| #12 | | | 9 | 12 | 15 | 14 | 17 | 16 | 19 | 18 | 21 | 20 | 23 | 22 | 25 | 24 | 27 | 26 | 29 | 28 | 31 | 30 | 33 | 32 | 35 | 38 | 41 | 44 | 39 | 42 | 45 | 48 |
| #13 | | | 13 | 16 | 19 | 18 | 21 | 20 | 23 | 22 | 25 | 24 | 27 | 26 | 29 | 28 | 31 | 30 | 33 | 32 | 35 | 34 | 37 | 36 | 39 | 42 | 45 | 48 | 43 | 46 | 49 | 52 |
| #14 | | | 17 | 20 | 23 | 22 | 25 | 24 | 27 | 26 | 29 | 28 | 31 | 30 | 33 | 32 | 35 | 34 | 37 | 36 | 39 | 38 | 41 | 40 | 43 | 46 | 49 | 52 | 47 | 50 | 53 | 56 |
| #15 | | | 21 | 24 | 27 | 26 | 29 | 28 | 31 | 30 | 33 | 32 | 35 | 34 | 37 | 36 | 39 | 38 | 41 | 40 | 43 | 42 | 45 | 44 | 47 | 50 | 53 | 56 | 51 | 54 | 57 | 60 |
| #16 | | | 25 | 28 | 31 | 30 | 33 | 32 | 35 | 34 | 37 | 36 | 39 | 38 | 41 | 40 | 43 | 42 | 45 | 44 | 47 | 46 | 49 | 48 | 51 | 54 | 57 | 60 | 55 | 58 | 61 | 64 |
| #17 | | | 29 | 32 | 35 | 34 | 37 | 36 | 39 | 38 | 41 | 40 | 43 | 42 | 45 | 44 | 47 | 46 | 49 | 48 | 51 | 50 | 53 | 52 | 55 | 58 | 61 | 64 | 59 | 62 | 65 | 68 |
| #18 | | | 33 | 36 | 39 | 38 | 41 | 40 | 43 | 42 | 45 | 44 | 47 | 46 | 49 | 48 | 51 | 50 | 53 | 52 | 55 | 54 | 57 | 56 | 59 | 62 | 65 | 68 | 63 | 66 | 69 | 72 |
| #19 | | | 37 | 40 | 43 | 42 | 45 | 44 | 47 | 46 | 49 | 48 | 51 | 50 | 53 | 52 | 55 | 54 | 57 | 56 | 59 | 58 | 61 | 60 | 63 | 66 | 69 | 72 | 67 | 70 | 73 | 76 |
| #20 | | | 41 | 44 | 47 | 46 | 49 | 48 | 51 | 50 | 53 | 52 | 55 | 54 | 57 | 56 | 59 | 58 | 61 | 60 | 63 | 62 | 65 | 64 | 67 | 70 | 73 | 76 | 71 | 74 | 77 | 80 |
| #21 | | | 45 | 48 | 51 | 50 | 53 | 52 | 55 | 54 | 57 | 56 | 59 | 58 | 61 | 60 | 63 | 62 | 65 | 64 | 67 | 66 | 69 | 68 | 71 | 74 | 77 | 80 | 75 | 78 | 81 | 84 |
| #22 | 1 | 2 | 49 | 52 | 55 | 54 | 57 | 56 | 59 | 58 | 61 | 60 | 63 | 62 | 65 | 64 | | | | | | | | | | | | | 79 | 82 | 85 | 88 |
| #23 | 2 | 6 | 53 | 56 | 59 | 58 | 61 | 60 | 63 | 62 | 65 | 64 | | | | | | | | | | | | | | | | | 83 | 86 | 89 | 92 |
| #24 | 3 | 9 | 57 | 60 | 63 | 62 | 65 | 64 | 67 | 66 | 69 | | | | | | | | | | | | | | | | | | 87 | 90 | 93 | 96 |

FIRST EMBODIMENT (k=4, s=8, L=3)

Fig. 10(A) PASS 1

| PIXEL<br>RASTER # | %1 | %2 | %3 | %4 | %5 | %6 | %7 | %8 | %1 | %2 |
|---|---|---|---|---|---|---|---|---|---|---|
| 1 | | | | | | | | | | |
| 2 | | | | | | | | | | |
| 3 | ● | | | | | | | ● | | |
| 4 | | | | | | | | | | |
| 5 | | | | | | | | | | |
| 6 | | | | | | | | | | |

Fig. 10(B) PASS 2

| PIXEL<br>RASTER # | %1 | %2 | %3 | %4 | %5 | %6 | %7 | %8 | %1 | %2 |
|---|---|---|---|---|---|---|---|---|---|---|
| 1 | | | | | | | | | | |
| 2 | | | | ● | | | | | | |
| 3 | ◎ | | | | | | | ◎ | | |
| 4 | | | 3 pixels | | | | | | | |
| 5 | | | | | | | | | | |
| 6 | | | | | | | | | | |

Fig. 10(C) PASS 3

| PIXEL<br>RASTER # | %1 | %2 | %3 | %4 | %5 | %6 | %7 | %8 | %1 | %2 |
|---|---|---|---|---|---|---|---|---|---|---|
| 1 | | | | | | | ● | | | |
| 2 | | | | | ◎ | | | | | |
| 3 | ○ | | | | 3 pixels | | | | ○ | |
| 4 | | | | | | | | | | |
| 5 | | | | | | | ● | | | |
| 6 | | | | | | | | | | |

Fig. 10(D) PASS 4

| PIXEL<br>RASTER # | %1 | %2 | %3 | %4 | %5 | %6 | %7 | %8 | %1 | %2 |
|---|---|---|---|---|---|---|---|---|---|---|
| 1 | | | | | | ○ | | | | |
| 2 | | | | ○ | | | | | | |
| 3 | ○ | | | | | | ○ | | | |
| 4 | | ● | | | | | | | ● | |
| 5 | | | | | | ◎ | | | | |
| 6 | | | | | | | 3 pixels | | | |

Fig. 10(E) PASS 5

| PIXEL<br>RASTER # | %1 | %2 | %3 | %4 | %5 | %6 | %7 | %8 | %1 | %2 |
|---|---|---|---|---|---|---|---|---|---|---|
| 1 | | | | | | | ○ | | | |
| 2 | | | | | ○ | | | | | |
| 3 | ○ | | | | | ● | | | ○ | |
| 4 | | | | ◎ | | | | | | ◎ |
| 5 | | | | 3 pixels | | | ○ | | | |
| 6 | | | | | | | | | | |

Fig. 10(F) PASS 6

| PIXEL<br>RASTER # | %1 | %2 | %3 | %4 | %5 | %6 | %7 | %8 | %1 | %2 |
|---|---|---|---|---|---|---|---|---|---|---|
| 1 | | | | | | | ○ | | | |
| 2 | | | | | ○ | | | ● | | |
| 3 | ○ | | | | | ◎ | | | ○ | |
| 4 | | | ○ | | | | 3 pixels | | | ○ |
| 5 | | | | | | | ○ | | | |
| 6 | | | | | | | | | | |

Fig. 10(G) PASS 7

| PIXEL<br>RASTER # | %1 | %2 | %3 | %4 | %5 | %6 | %7 | %8 | %1 | %2 |
|---|---|---|---|---|---|---|---|---|---|---|
| 1 | 3 pixels | | | | | ● | | ○ | | |
| 2 | | | | | ○ | | | | ◎ | |
| 3 | ○ | | | | ○ | | | | ○ | |
| 4 | | | ○ | | | | | | | ○ |
| 5 | | | ● | | | | ○ | | | |
| 6 | | | | | | | | | | |

Fig. 10(H) PASS 8

| PIXEL<br>RASTER # | %1 | %2 | %3 | %4 | %5 | %6 | %7 | %8 | %1 | %2 |
|---|---|---|---|---|---|---|---|---|---|---|
| 1 | | | ○ | | | ○ | | | | |
| 2 | | | | | ○ | | | ○ | | |
| 3 | ○ | | | | ○ | | | | ○ | |
| 4 | | | ○ | | | ● | | | | ○ |
| 5 | | | | | ◎ | | ○ | | | |
| 6 | | | | | | 3 pixels | | | | |

○ DOT RECORDED BEFORE
◎ DOT RECORDED ON PREVIOUS PASS
● DOT RECORDED ON CURRENT PASS

Fig. 11

SCAN PARAMETERS OF COMPARATIVE EXAMPLE

Nozzle pitch : k = 4 [dots]
Number of scan repeats : s = 8
Number of used nozzles : N = 24
Number of effective nozzles : Neff = 3

| PASS No. | 1 | 2 | 3 | 4 | 5 | 6 | 7 | 8 | 9 |
|---|---|---|---|---|---|---|---|---|---|
| SUB-SCAN No. | 0 | 1 | 2 | 3 | 4 | 5 | 6 | 7 | 8 |
| FEED L [dots] | - | 3 | 3 | 3 | 3 | 3 | 3 | 3 | 3 |
| $\Sigma L$ | - | 3 | 6 | 9 | 12 | 15 | 18 | 21 | 24 |
| F=($\Sigma L$)%k | - | 3 | 2 | 1 | 0 | 3 | 2 | 1 | 0 |
| PIXEL POSITION | %1 | %2 | %3 | %4 | %5 | %6 | %7 | %8 | %2 |
| SHIFT $\Delta$% | - | 1 | 1 | 1 | 1 | 1 | 1 | 1 | 3 |

COMPARATIVE EXAMPLE (k=4, s=8, L=3)

Fig. 12(A) PASS 1

| PIXEL RASTER # | %1 | %2 | %3 | %4 | %5 | %6 | %7 | %8 | %1 | %2 |
|---|---|---|---|---|---|---|---|---|---|---|
| 1 | | | | | | | | | | |
| 2 | | | | | | | | | | |
| 3 | ● | | | | | | | ● | | |
| 4 | | | | | | | | | | |
| 5 | | | | | | | | | | |
| 6 | | | | | | | | | | |

Fig. 12(B) PASS 2

| PIXEL RASTER # | %1 | %2 | %3 | %4 | %5 | %6 | %7 | %8 | %1 | %2 |
|---|---|---|---|---|---|---|---|---|---|---|
| 1 | | | | | | | | | | |
| 2 | | | | | | | | | ● | |
| 3 | ◎ | | | | | | | ◎ | | |
| 4 | | | | | | | | | | |
| 5 | | | | | | | | | | |
| 6 | | | | | | | | | ● | |

Fig. 12(C) PASS 3

| PIXEL RASTER # | %1 | %2 | %3 | %4 | %5 | %6 | %7 | %8 | %1 | %2 |
|---|---|---|---|---|---|---|---|---|---|---|
| 1 | | | ● | | | | | | | |
| 2 | | ◎ | | | | | | | | ◎ |
| 3 | ○ | | | | | | | ○ | | |
| 4 | | | | | | | | | | |
| 5 | | | ● | | | | | | | |
| 6 | | ◎ | | | | | | | | ◎ |

Fig. 12(D) PASS 4

| PIXEL RASTER # | %1 | %2 | %3 | %4 | %5 | %6 | %7 | %8 | %1 | %2 |
|---|---|---|---|---|---|---|---|---|---|---|
| 1 | | | ◎ | | | | | | | |
| 2 | | ○ | | | | | | | | ○ |
| 3 | ○ | | | | | | | ○ | | |
| 4 | | | | | ● | | | | | |
| 5 | | | ◎ | | | | | | | |
| 6 | | ○ | | | | | | | | ○ |

Fig. 12(E) PASS 5

| PIXEL RASTER # | %1 | %2 | %3 | %4 | %5 | %6 | %7 | %8 | %1 | %2 |
|---|---|---|---|---|---|---|---|---|---|---|
| 1 | | | | ○ | | | | | | |
| 2 | | | ○ | | | | | | | ○ |
| 3 | | ○ | | | | ● | | | | ○ |
| 4 | | | | | ◎ | | | | | |
| 5 | | ○ | | | | | | | | |
| 6 | | ○ | | | | | | | | ○ |

Fig. 12(F) PASS 6

| PIXEL RASTER # | %1 | %2 | %3 | %4 | %5 | %6 | %7 | %8 | %1 | %2 |
|---|---|---|---|---|---|---|---|---|---|---|
| 1 | | | | ○ | | | | | | |
| 2 | | | ○ | | | ● | | | | ○ |
| 3 | | ○ | | | ◎ | | | | | ○ |
| 4 | | | | ○ | | | | | | |
| 5 | | ○ | | | | | | | | |
| 6 | | ○ | | | ● | | | | | ○ |

Fig. 12(G) PASS 7

| PIXEL RASTER # | %1 | %2 | %3 | %4 | %5 | %6 | %7 | %8 | %1 | %2 |
|---|---|---|---|---|---|---|---|---|---|---|
| 1 | | | | ○ | | ● | | | | |
| 2 | | | ○ | | | ◎ | | | | ○ |
| 3 | | ○ | | | ○ | | | | | ○ |
| 4 | | | | ○ | | | | | | |
| 5 | | ○ | | | | ● | | | | |
| 6 | | ○ | | | ◎ | | | | | ○ |

Fig. 12(H) PASS 8

| PIXEL RASTER # | %1 | %2 | %3 | %4 | %5 | %6 | %7 | %8 | %1 | %2 |
|---|---|---|---|---|---|---|---|---|---|---|
| 1 | | | | ○ | | ◎ | | | | |
| 2 | | | ○ | | | ○ | | | | ○ |
| 3 | | ○ | | | ○ | | | | | ○ |
| 4 | | | | ○ | | | ● | | | |
| 5 | | ○ | | | | ◎ | | | | |
| 6 | | ○ | | | ○ | | | | | ○ |

○ DOT RECORDED BEFORE
◎ DOT RECORDED ON PREVIOUS PASS
● DOT RECORDED ON CURRENT PASS

Fig. 13

SCAN PARAMETERS OF SECOND EMBODIMENT

Nozzle pitch : k = 4 [dots]
Number of scan repeats : s = 8
Number of used nozzles : N = 24
Number of effective nozzles : Neff = 3

| PASS No. | 1 | 2 | 3 | 4 | 5 | 6 | 7 | 8 | 9 |
|---|---|---|---|---|---|---|---|---|---|
| SUB-SCAN No. | 0 | 1 | 2 | 3 | 4 | 5 | 6 | 7 | 8 |
| FEED L [dots] | - | 3 | 3 | 3 | 3 | 3 | 3 | 3 | 3 |
| $\Sigma L$ | - | 3 | 6 | 9 | 12 | 15 | 18 | 21 | 24 |
| F=($\Sigma L$)%k | - | 3 | 2 | 1 | 0 | 3 | 2 | 1 | 0 |
| PIXEL POSITION | %4 | %7 | %3 | %6 | %1 | %5 | %8 | %2 | %5 |
| SHIFT $\Delta$% | - | 3 | 4 | 3 | 3 | 4 | 3 | 2 | 3 |

SECOND EMBODIMENT (k=4, s=8, L=3)

Fig. 14(A) PASS 1

Fig. 14(B) PASS 2

Fig. 14(C) PASS 3

Fig. 14(D) PASS 4

Fig. 14(E) PASS 5

Fig. 14(F) PASS 6

Fig. 14(G) PASS 7

Fig. 14(H) PASS 8

○ DOT RECORDED BEFORE
◎ DOT RECORDED ON PREVIOUS PASS
● DOT RECORDED ON CURRENT PASS

Fig. 15

SCAN PARAMETERS OF THIRD EMBODIMENT

Nozzle pitch : k = 6 [dots]
Number of scan repeats : s = 8
Number of used nozzles : N = 40
Number of effective nozzles : Neff = 5

| PASS No. | 1 | 2 | 3 | 4 | 5 | 6 | 7 |
|---|---|---|---|---|---|---|---|
| SUB-SCAN No. | 0 | 1 | 2 | 3 | 4 | 5 | 6 |
| FEED L [dots] | - | 5 | 5 | 5 | 5 | 5 | 5 |
| $\Sigma L$ | - | 5 | 10 | 15 | 20 | 25 | 30 |
| $F=(\Sigma L)\%k$ | - | 5 | 4 | 3 | 2 | 1 | 0 |
| PIXEL POSITION | %1 | %4 | %7 | %2 | %5 | %8 | %3 |
| SHIFT $\Delta\%$ | - | 3 | 3 | 3 | 3 | 3 | 3 |
| PASS No. | | 8 | 9 | 10 | 11 | 12 | 13 |
| SUB-SCAN No. | | 7 | 8 | 9 | 10 | 11 | 12 |
| FEED L [dots] | | 5 | 5 | 5 | 5 | 5 | 5 |
| $\Sigma L$ | | 35 | 40 | 45 | 50 | 55 | 60 |
| $F=(\Sigma L)\%k$ | | 5 | 4 | 3 | 2 | 1 | 0 |
| PIXEL POSITION | | %6 | %4 | %7 | %2 | %5 | %8 |
| SHIFT $\Delta\%$ | | 3 | 6 | 3 | 3 | 3 | 3 |

Fig. 16

THIRD EMBODIMENT (RASTER LINE NUMMBER SERVICED BY EACH NOZZLE)

THIRD EMBODIMENT (k=6, s=8, L=5)

Fig. 17(A) PASS 1
Fig. 17(B) PASS 2
Fig. 17(C) PASS 3
Fig. 17(D) PASS 4
Fig. 17(E) PASS 5
Fig. 17(F) PASS 6
Fig. 17(G) PASS 7
Fig. 17(H) PASS 8

○ DOT RECORDED BEFORE
◎ DOT RECORDED ON PREVIOUS PASS
● DOT RECORDED ON CURRENT PASS

DOT RECORDING FOR PREVENTING ADJACENCY OF RECORDING POSITIONS

BACKGROUND OF THE INVENTION

1. Field of the Invention

The present invention relates to a technique of printing dots on the surface of a printing medium with a dot print head.

2. Description of the Related Art

Serial scan-type printers and drum scan-type printers are dot recording devices which record dots with a print head while carrying out scans both in a main scanning direction and a sub-scanning direction. There is a technique called "interlace scheme", which is taught by U.S. Pat. No. 4,198,642 and Japanese Patent Laid-Open Gazette No. 53-2040, for improving the image quality of printers of this type, especially ink jet printers.

FIG. 18 is a diagram for explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning amount [dots] or [inch];
w: Dot pitch [inch].

The number of nozzles N is the number of nozzles actually used to form dots. In the example of FIG. 18, N=3. The nozzle pitch k is the interval between the centers of the recording head nozzles expressed in units of the recorded image pitch (dot pitch w). In the example of FIG. 18, k=2. The number of scan repeats s is the number of main scans in which all dot positions on a main scanning line are serviced. In the example of FIG. 18, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the print head. The sub-scanning amount L (inch) is the distance moved in 1 sub-scan. The dot pitch w (inch) is the pitch of the dots in the recorded image. In general, it holds that $w=1/(D \cdot k)$, $k=1/(D \cdot w)$.

The circles containing two-digit numerals in FIG. 18 indicate dot recording positions. As indicated in the legend, the numeral on the left in each circle indicates the nozzle number and the numeral on the right indicates the recording order (the number of the main scan in which it was recorded).

The interlace scheme shown in FIG. 18 is characterized by the configuration of the nozzle array of the recording head and the sub-scanning method. Specifically, in the interlace scheme, the nozzle pitch k indicating the interval between the centers of adjacent nozzles is defined as an integer at least 2, while the number of nozzles N and the nozzle pitch k are selected as integers which are relatively prime. Two integers are "relatively prime" when they do not have a common divisor other than 1. Further, sub-scanning pitch L is set at a constant value given by $N/(D \cdot k)$.

The interlace scheme makes irregularities in nozzle pitch and ink jetting feature to thin out over the recorded image. Because of this, it improves image quality by mitigating the effect of any irregularity that may be present in the nozzle pitch, the jetting feature and the like.

The "overlap scheme", also known as the "multi-scan scheme", taught for example by Japanese Patent Laid-Open Gazette No. 3-207665 and Japanese Patent Publication Gazette No. 4-19030 is another technique used to improve image quality in color ink jet printers.

FIG. 19 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 19, a dot is formed at every second dot position. The timing of the driving of the nozzle sets is controlled so that the each nozzle set forms dots at different positions from the other in the main scanning direction. In other words, as shown in FIG. 19, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pick k is set at an integer at least 2, as in the interlace scheme. However, the number of nozzles N and the nozzle pitch k are not relatively prime, but the nozzle pitch k and the value N/s, which is obtained by dividing the number of nozzles N by the number of scan repeats s, are set at relatively prime integers instead.

In the overlap scheme, the dots of each main scanning line are not all recorded by the same nozzle but by multiple nozzles. Even when the nozzle characteristics (pitch, jetting feature etc.) are not completely uniform, therefore, enhanced image quality can be obtained because the characteristics of the individual nozzles is prevented from affecting the entire main scanning line.

As described above, a variety of dot recording schemes have been proposed so far. These conventional dot recording schemes, however, have a problem that the dots recorded by a certain pass of main scan are often adjacent to the dots recorded by a previous pass immediately before the certain pass. In the specification hereof, the expression "two dots are adjacent to each other" includes not only the case where one dot is present at the position immediately above, immediately below, on the immediate left of, or on the immediate right of another dot, but the case where one dot is present at the position oblique to another dot. Namely a certain dot is "adjacent" to another dot when the certain dot is present at any one of eight neighbor positions to another dot.

Recording a new dot in a current pass at the position adjacent to another dot recorded in the previous pass often causes ink blot or deviation of dot density. The conventional dot recording schemes thus result in undesirably deteriorating image quality.

SUMMARY OF THE INVENTION

Accordingly, an object of the present invention is to relieve the deterioration of the image quality due to ink blot or deviation of dot density.

Recording positions on each pass of main scan are set so that the dot recording positions for an identical color appear once every s dots in a main scanning direction on each raster line where s is an integer of at least 5. A sub-scan feed amount after each pass and the dot recording positions on each pass of the main scan are set so that the dot recording positions on any two consecutive passes are separated from each other.

This arrangement advantageously prevents the recording positions on any two consecutive passes of the main scan from being adjacent to each other, thereby relieving the deterioration of the image quality due to the ink blot or the dot density deviation.

The recording positions may be determined in such a manner that the recording positions with respect to at least (s−1) passes among s consecutive passes are shifted by a fixed amount in the main scanning direction on each pass.

This arrangement shifts the recording positions on each pass in a substantially regular manner, thereby further improving in image quality.

The fixed amount of the shift of the recording positions on each pass may be m times a dot pitch in the main scanning direction where m is an integer selected for each pass within a range of at least 2 and at most (s−2).

This arrangement effectively prevents the recording positions on two consecutive passes from being adjacent to each other even if the main scanning lines to be recorded by the two consecutive passes adjoin to each other.

The integer m defining the fixed amount of the shift for the (s−1) passes may be prime to the integer s.

This arrangement makes the shift of the recording positions for each pass to be a fixed value with respect to (s−1) passes of the main scan.

The present invention can be embodied in various forms such as a dot recording method, a dot recording apparatus, a computer program that has the functions of the method or of the apparatus, a computer readable medium on which is recorded the computer program, and a data signal embodied in a carrier wave comprising the computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 5(A) and 5(B) show an arrangement of ink jet nozzles on ink jet heads 61 through 64;

FIGS. 6(A) and 6(B) show the fundamental conditions of a general dot recording scheme when the number of scan repeats s is equal to 1;

FIGS. 7(A) and 7(B) show the fundamental conditions of a general dot recording scheme when the number of scan repeats s is at least 2;

FIG. 8 shows scan parameters in a first embodiment according to the present invention;

FIG. 9 shows raster numbers recorded by the respective nozzles on each pass in the first embodiment;

FIGS. 10(A)–10(H) show the shift of the recording positions in the first embodiment;

FIG. 11 shows scan parameters in a comparative example;

FIGS. 12(A)–12(H) show the shift of the recording positions in the comparative example;

FIG. 13 shows scan parameters in a second embodiment according to the present invention;

FIGS. 14(A)–14(H) show the shift of the recording positions in the second embodiment;

FIG. 15 shows scan parameters in a third embodiment according to the present invention;

FIG. 16 shows raster numbers recorded by the respective nozzles on each pass in the third embodiment;

FIGS. 17(A)–17(H) show the shift of the recording positions in the third embodiment;

DESCRIPTION OF THE PREFERRED EMBODIMENT

A. Structure of Apparatus

Figure 1:
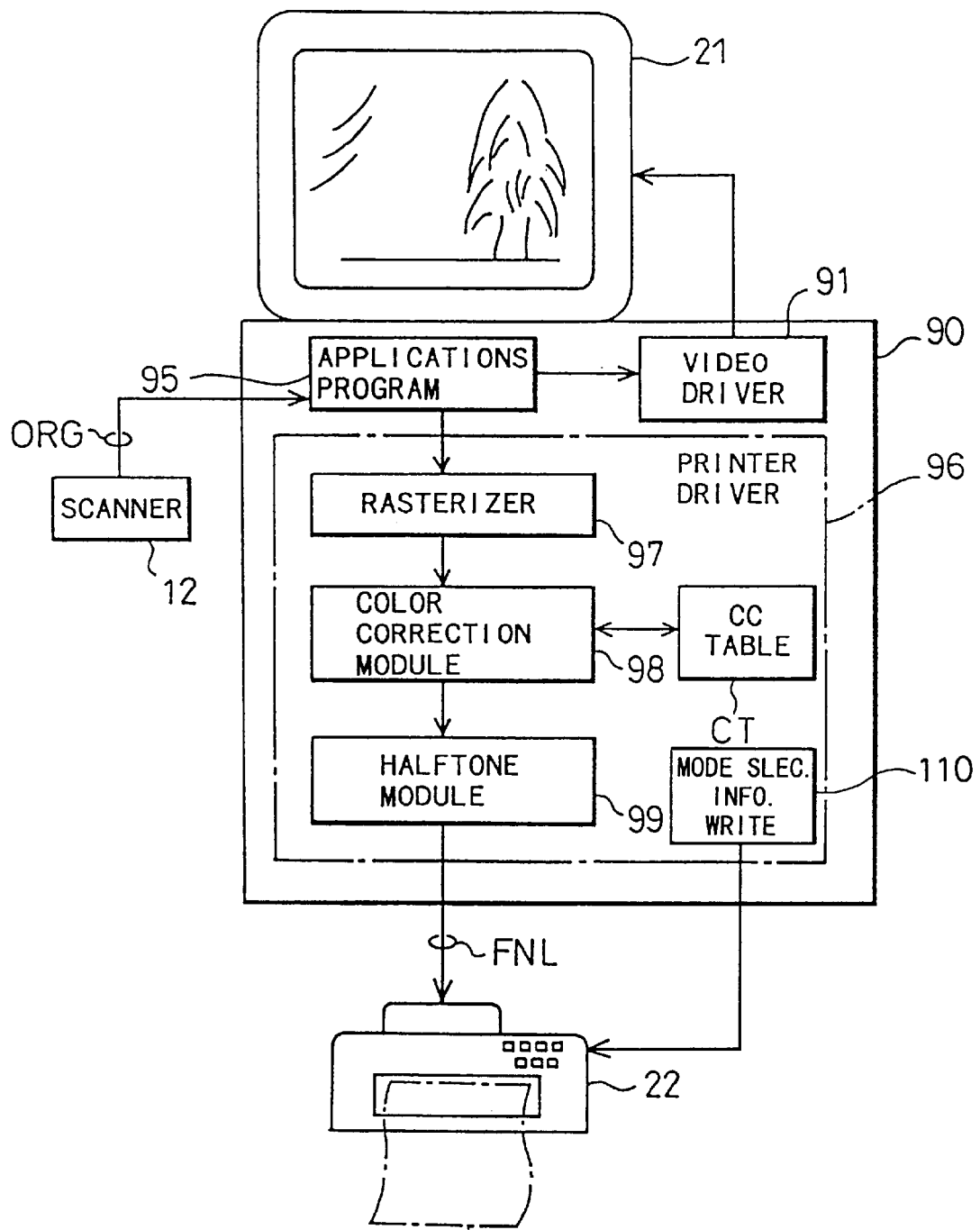
FIG. 1 is a block diagram schematically illustrating the configuration of an image processing system of the present invention.

FIG. 1 is a block diagram illustrating the configuration of a color printing system embodying the present invention. The color printing system includes a scanner 12, a personal computer 90, and a color printer 22. The personal computer 90 includes a color display 21. The scanner 21 captures color image data of a color original, and supplies the original color image data ORG, including R, G, and B components, to the computer 90.

The computer 90 is provided therein with CPU, RAM, and ROM (not shown), and an applications program 95 runs under a specific operating system. A video driver 91 and a printer driver 96 are incorporated in the operating system, and print data FNL are output through these drivers. The applications program 95 used to, for example, retouch an image, reads an image from the scanner, execute a prescribed processing, and displays the image on the CRT display 93 through the video driver 91. When the applications program 95 outputs a printing instruction, the printer driver 96 receives image information from the applications program 95 and converts the input image information to printing signals for the printer 22. (The printing signals are binarized signals for the respective colors of C, M, Y, and K.) In the example of FIG. 1, the printer driver 96 includes: a rasterizer 97 for converting the color image data processed by the applications program 95 to dot-based image data; a color correction module 98 for executing color correction on the dot-based image data according to the ink colors of C, M, and Y used by the printer 22 and the calorimetric characteristics of the printer 22; a color correction table CT referred to by the color correction module 98; a halftone module 99 for generating halftone image data, which represents image density in a particular area by on/off of ink in each dot, from the color-corrected image data; and mode selection writing module 110 for writing mode selection information, which will be described later, into a memory in the color printer 22.

The print data FNL, which is supplied from the computer 90 to the printer 22, includes raster data representing a recording state of each pixel on each raster line during each pass of main scan, and a sub-scan feed amount after each main scan. The printer 22 execute printing operation according to the print data FNL.

Figure 2:
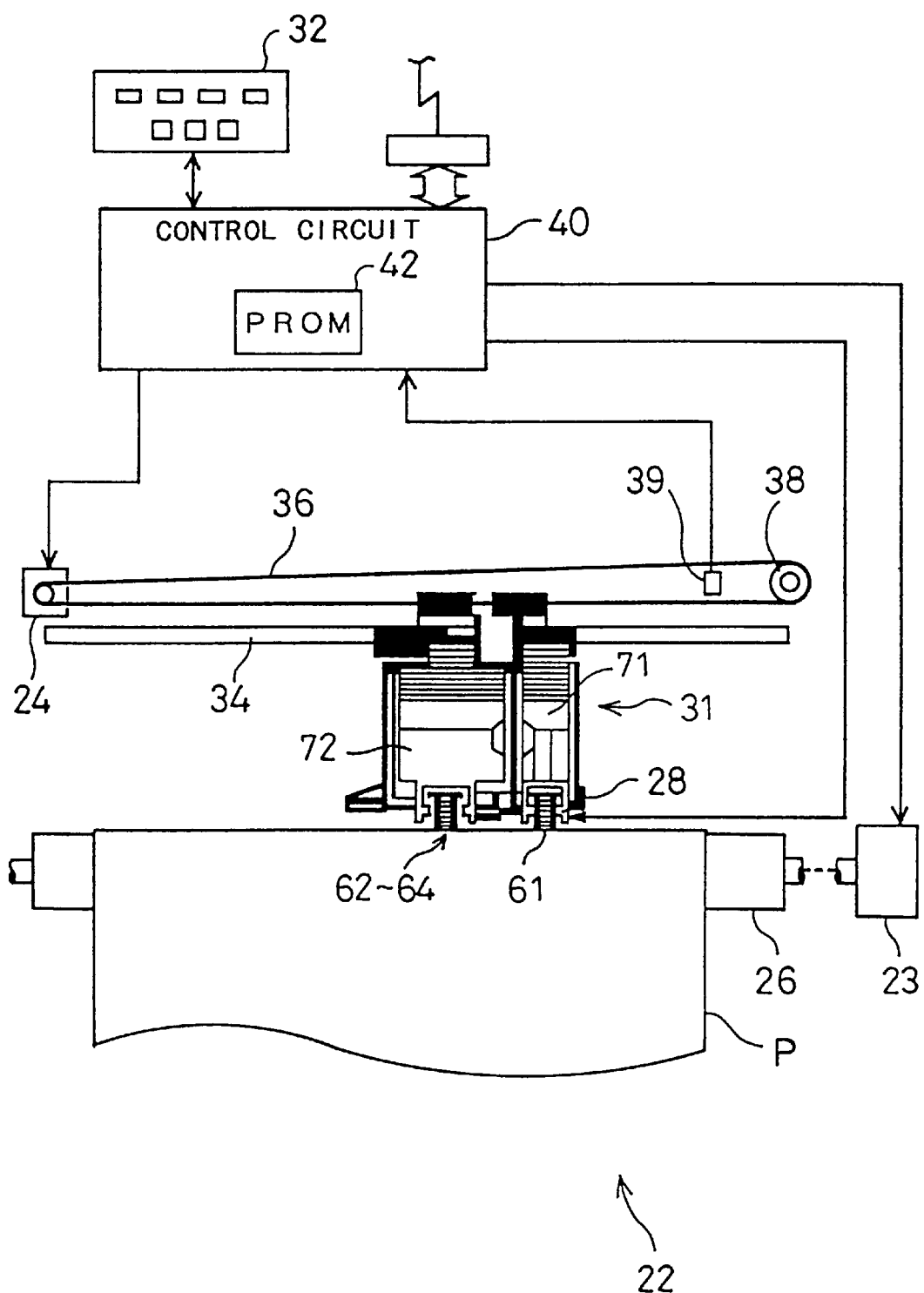
FIG. 2 schematically illustrates the configuration of a color printer 20.

FIG. 2 schematically illustrates the configuration of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61 through 64 are formed on the print head 28 that is disposed in the lower portion of the carriage 31, and ink supply conduits 65 (see FIG. 3) are formed in the bottom portion of the carriage 31 for leading supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 3:
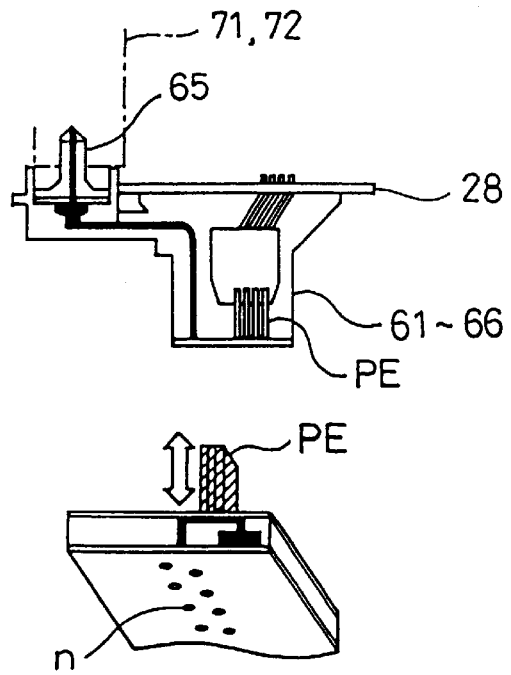
FIG. 3 shows the configuration of a print head 28.

The following briefly describes the mechanism of discharging ink. When the ink cartridges 71 and 72 are attached to the carriage 31, inks in the ink cartridges 71 and 72 are sucked out through the ink supply conduits 65 and are led to the ink discharge heads 61 through 64 formed in the print head 28 arranged in the lower portion of the carriage 31 as shown in FIG. 3. When the ink cartridges 71 and 72 are attached to the carriage 31, a pump works to suck first supplies of ink into the respective ink discharge heads 61 through 64. In this embodiment, the configurations of the pump for suction and a cap for covering the print head 28 during the suction are not illustrated nor described specifically.

Figure 4:
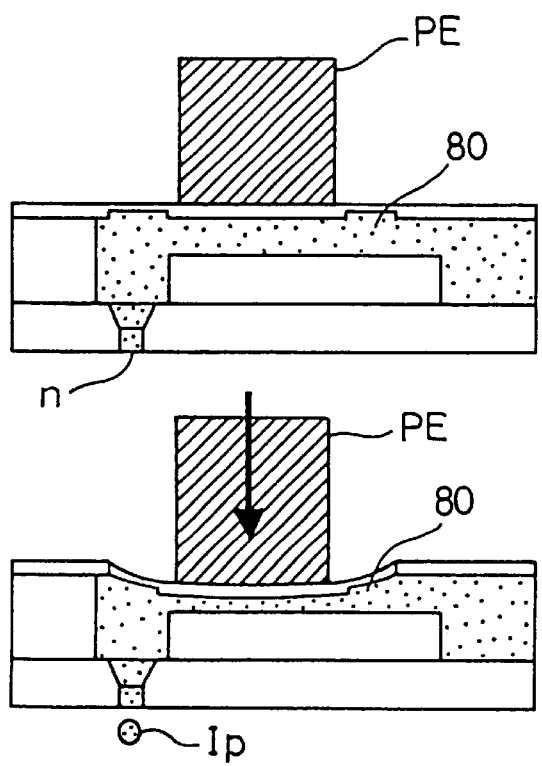
FIG. 4 shows the principle of ink jet.
Figure 18:
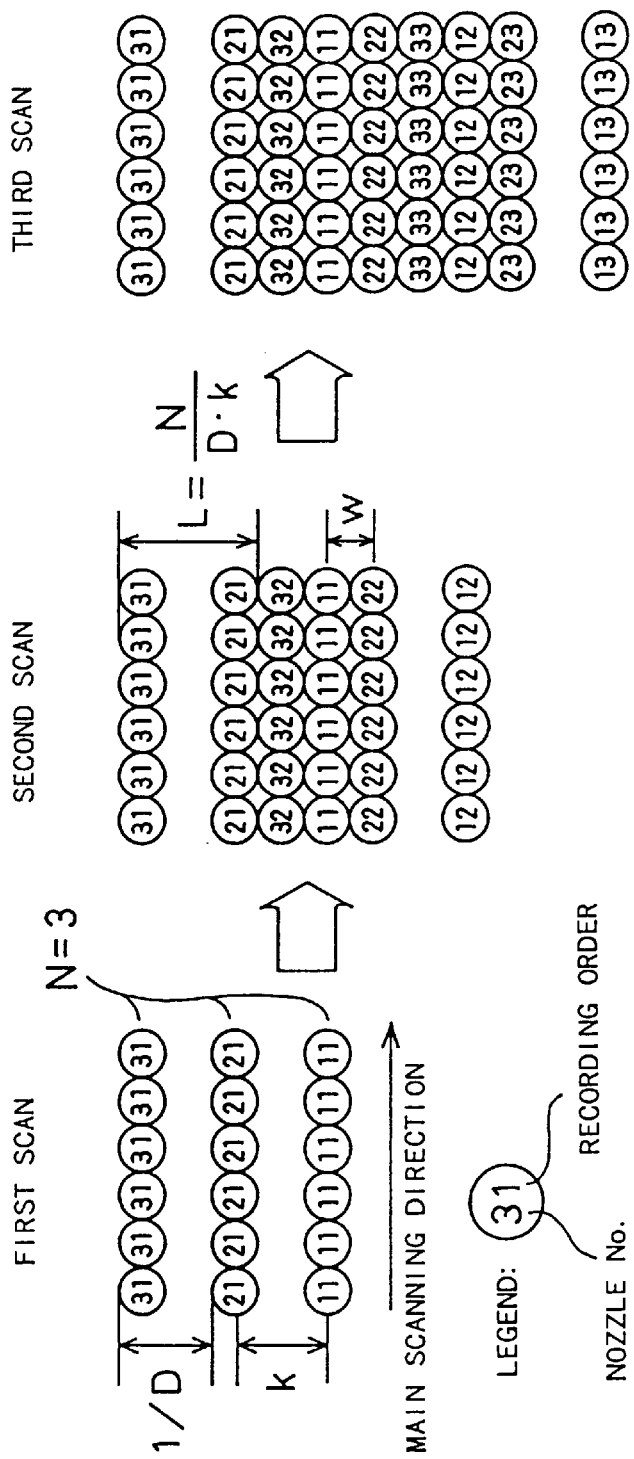
FIG. 18 shows a conventional interlace recording scheme.
Figure 19:
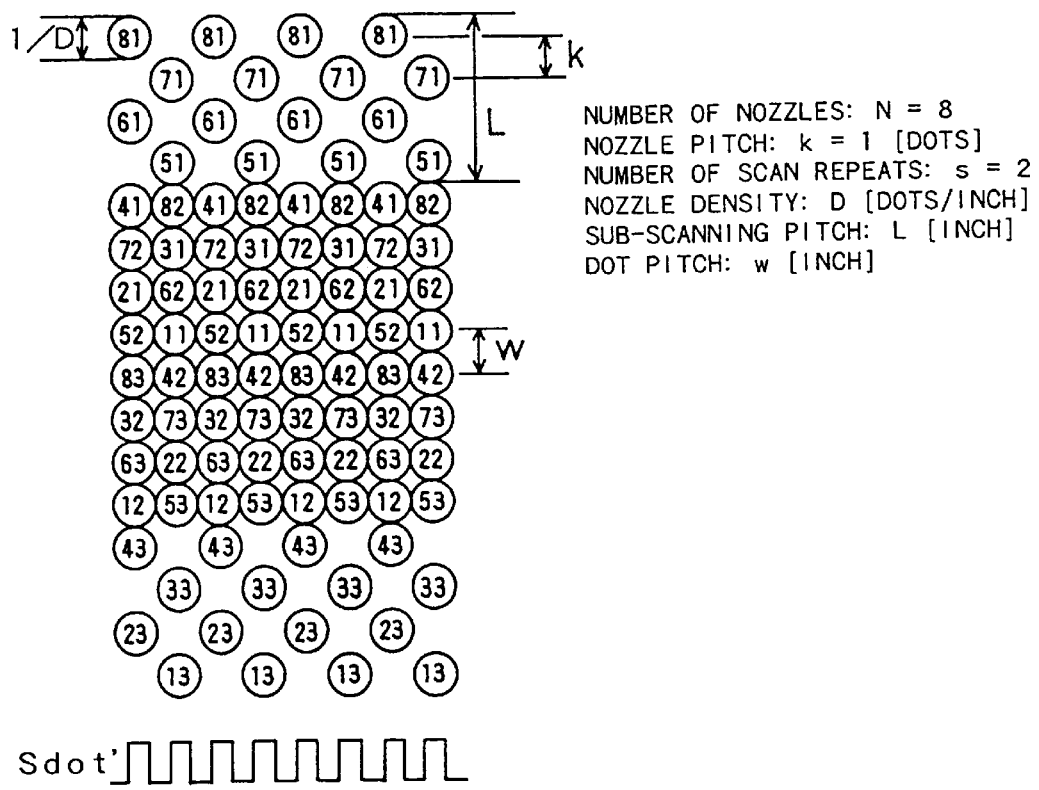
FIG. 19 shows a conventional overlap recording scheme.

An array of thirty-two nozzles "n" is formed in each of the ink discharge heads 61 through 64 as shown in FIG. 3. A piezoelectric element PE, which is one of electrically distorting elements and has an excellent response, is provided for each nozzle "n". FIG. 4 illustrates a configuration of the piezoelectric element PE and the nozzle "n". The piezoelectric element PE is disposed at a position that comes into contact with an ink conduit 80 for leading ink to the nozzle "n". As is known, the piezoelectric element PE has a crystal configuration that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 80 as shown in the lower part of FIG. 4. The volume of the ink conduit 80 is reduced with an extension of the piezoelectric element PE, and a certain amount of ink corresponding to the reduced volume is sprayed as ink particles Ip from the ends of the nozzle "n" at a high speed. The ink particles Ip soak into the sheet of paper P set on the platen 26, so as to reproduce a print.

In the printer 22 of the embodiment having the hardware configuration discussed above, the sheet feed motor 23 rotates the platen 26 and the other related rollers to feed the printing paper P. The carriage motor 24 drives and reciprocates the carriage 31, simultaneously with actuation of the piezoelectric elements PE on the respective ink discharge heads 61 through 64 of the print head 28. The printer 22 accordingly sprays the respective color inks and forms a multi-color image on the printing paper P. Concrete arrangements of the nozzles in the respective ink discharge heads 61 through 64 will be discussed later.

The mechanism for feeding the printing paper P includes a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 for detecting the position of the origin of the carriage 31.

The control circuit 40 includes a CPU (not shown), main memories having a ROM and a RAM (not shown), and a programmable ROM (PROM) 42, which is a rewritable non-volatile memory. The PROM 42 stores dot recording mode information including parameters with respect to a plurality of dot recording modes. The "dot recording mode" denotes the dot recording scheme defined by parameters such as the number of actually used nozzles N and the sub-scan feed amount L. In the specification hereof, the terms "recording scheme" and "recording mode" have substantially the same meanings. Concrete examples of the dot recording modes and their related parameters will be described later. Mode selection information is also stored in the PROM 42 to select a desired mode among the plurality of dot recording modes. For example, when the PROM 42 can store sixteen pieces of dot recording mode information, the mode selection information consists of four-bit data.

The dot recording mode information is read by the printer driver 96 from the PROM 42 when the printer driver 96 (FIG. 1) is installed at the startup of the computer 90. In more concrete terms, the printer driver 96 reads the dot recording mode information corresponding to a desired dot recording mode specified by the mode selection information from the PROM 42. The processes in the rasterizer 97 and the halftone module 99 as well as the main scans and sub-scans are carried out according to the dot recording mode information.

The PROM 42 may be any rewritable non-volatile memory and is, for example, an EEPROM or a flash memory. The dot recording mode information may be stored in a non-rewritable ROM, while it is preferable that the mode selection information is stored in the rewritable non-volatile memory. Plural sets of dot recording mode information may be stored in a storage device other than the PROM 42 or alternatively in the printer driver 96.

FIGS. 5(A) and 5(B) show an arrangement of ink jet nozzles in the ink discharge heads 61 through 64. The first head 61 has a nozzle array for jetting black ink. Similarly the second through the fourth heads 62 through 64 respectively have nozzle arrays for jetting cyan, magenta, and yellow inks. These four nozzle arrays have identical positions in the sub-scanning direction.

Each of the four nozzle arrays includes 32 nozzles arranged in a zigzag manner with a constant nozzle pitch k in the sub-scanning direction. The plurality of nozzle n included in each nozzle array may be arranged in alignment, instead of in the zigzag manner. The zigzag arrangement as shown in FIG. 5(A), however, has the advantage of being able to set a smaller nozzle pitch k in the manufacturing process.

FIG. 5(B) shows an arrangement of a plurality of dots formed by one nozzle array. In this embodiment, driving signals are supplied to the piezoelectric elements PE (FIG. 4) of the respective nozzles in order to cause a plurality of dots formed by one nozzle array to be arranged substantially in alignment in the sub-scanning direction, regardless of the arrangement of the ink nozzles; that is, whether the nozzles are arranged in zigzag or in alignment. By way of example, it is assumed that the nozzles are arranged in zigzag as shown in FIG. 5(A) and that the head 61 is scanned rightward in the drawing to form dots. In this case, a group of preceding nozzles 100, 102, . . . receive driving signals at an earlier timing by d/v [second] than a group of following nozzles 101, 103 . . . . Here, d [inch] denotes a pitch between the two nozzle groups in the head 61 (See FIG. 5(A)), and v [inch/second] denotes the scanning speed of the head 61. A plurality of dots formed by one nozzle array are accordingly arranged in alignment in the sub-scanning direction. As described later, all of the plural nozzles provided in each of the heads 61 through 64 are not always used, but only part of the nozzles may be used according to the dot recording scheme.

The ink discharge heads shown in FIG. 5(A) correspond to the dot recording head of the claimed invention. The feeding mechanism of the carriage 31 including the carriage motor 24 shown in FIG. 2 corresponds to the main scan driving unit, whereas the feeding mechanism of the paper including the sheet feed motor 23 corresponds to the sub-scan driving unit. A circuit including the piezoelectric element PE of each nozzle corresponds to the print head driving unit 214. The control circuit 40 and the printer driver 96 (FIG. 1) correspond to the controller of the claimed invention.

B. Basic Conditions of General Recording Scheme

Before describing the dot recording schemes used in the embodiment of the present invention, the following describes basic conditions required for general recording schemes.

FIGS. 6(A) and 6(B) show basic conditions of a general dot recording scheme when the number of scan repeats s is equal to one. FIG. 6(A) illustrates an example of sub-scan feeds with four nozzles, and FIG. 6(B) shows parameters of the dot recording scheme. In the drawing of FIG. 6(A), solid circles including numerals indicate the positions of the four nozzles in the sub-scanning direction after each sub-scan feed. The encircled numerals 0 through 3 denote the nozzle numbers. The four nozzles are shifted in the sub-scanning direction every time when one main scan is concluded. Actually, however, the sub-scan feed is executed by feeding a printing paper with the sheet feed motor 23 (FIG. 2).

As shown in the left-hand side of FIG. 6(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 6(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area (or the "non-effective print area)". All the area which is scanned with the nozzles (including both the effective record area and the non-effective record area) is referred to as the nozzle scan area.

Various parameters related to the dot recording scheme are shown in FIG. 6(B). The parameters of the dot recording scheme include the nozzle pitch k [dots], the number of used nozzles N, the number of scan repeats s, number of effective nozzles Neff, and the sub-scan feed amount L [dots].

In the example of FIGS. 6(A) and 6(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 6(A) and 6(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 6(B) shows the sub-scan feed amount L, its accumulated value $\Sigma L$, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 6(A)). For example, as shown in FIG. 6(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 6(A)). Similarly, the position of the nozzles after the second sub-scan feed is $\Sigma L(=8)$ dots away from the initial position so that the offset F is 2. The position of the nozzles after the third sub-scan feed is $\Sigma L(=12)$ dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by $(\Sigma L)\%k$, where $\Sigma L$ is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k−1).

Condition c3: Average sub-scan feed amount ($\Sigma L/k$) is equal to the number of used nozzles N. In other words, the accumulated value $\Sigma L$ of the sub-scan feed amount L for the whole feed cycle is equal to a product (N×k) of the number of used nozzles N and the nozzle pitch k.

The above conditions can be understood as follows. Since (k−1) raster lines are present between adjoining nozzles, the number of sub-scan feeds required in one feed cycle is equal to k so that the (k−1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k−1). The second condition c2 is accordingly required.

When the first and the second conditions c1 and c2 are satisfied, each of the N nozzles records k raster lines in one feed cycle. Namely N×k raster lines can be recorded in one feed cycle. When the third condition c3 is satisfied, the nozzle position after one feed cycle (that is, after the k sub-scan feeds) is away from the initial position by the N×k raster lines as shown in FIG. 6(A). Satisfying the above first through the third conditions c1 to c3 thus prevents skipping or overwriting of raster lines to be recorded in the range of N×k raster lines.

FIGS. 7(A) and 7(B) show the basic conditions of a general dot recording scheme when the number of scan repeats s is at least 2. When the number of scan repeats s is 2 or greater, each raster line is recorded with s different nozzles. In the description hereinafter, the dot recording scheme adopted when the number of scan repeats s is at least 2 is referred to as the "overlap scheme".

The dot recording scheme shown in FIGS. 7(A) and 7(B) amounts to that obtained by changing the number of scan repeats s and the sub-scan feed amount L among the dot recording scheme parameters shown in FIG. 6(B). As will be understood from FIG. 7(A), the sub-scan feed amount L in the dot recording scheme of FIGS. 7(A) and 7(B) is a constant value of two dots. In FIG. 7(A), the nozzle positions after the odd-numbered sub-scan feeds are indicated by the diamonds. As shown on the right-hand side of FIG. 7(A), the dot positions recorded after the odd-numbered sub-scan feed are shifted by one dot in the main scanning direction from the dot positions recorded after the even-numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 7(A). In one possible scheme, dot recording is executed at the positions indicated by the circles shown in the right-hand side of FIG. 7(A) after the first sub-scan feed, and is executed at the shifted positions indicated by the diamonds after the fourth sub-scan feed.

The lower-most row of the table of FIG. 7(B) shows the values of the offset F after each sub-scan feed in one feed cycle. One feed cycle includes six sub-scan feeds. The offsets F after each of the six sub-scan feeds assume every value between 0 and 2, twice. The shift in the offset F after the first through the third sub-scan feeds is identical with that after the fourth through the sixth sub-scan feeds. As shown on the left-hand side of FIG. 7(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of at least 2, the first through the third conditions c1 to c3 discussed above are rewritten into the following conditions c1' through c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k−1), s times.

Condition c3': Average sub-scan feed amount {ΣL/(k×s)} is equal to the number of effective nozzles Neff (=N/s). In other words, the accumulated value ΣL of the sub-scan feed amount L for the whole feed cycle is equal to a product {Neff×(k×s)} of the number of effective nozzles Neff and the number of sub-scan feeds (k×s).

The above conditions c1' through c3' hold even when the number of scan repeats s is one. This means that the conditions c1' through c3' generally hold for the dot recording scheme irrespective of the number of scan repeats s. When these three conditions c1' through c3' are satisfied, there is no skipping or overwriting of dots recorded in the effective record area. If the overlap scheme is applied (if the number of scan repeats s is at least 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1' through c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

C. Embodiments of Dot Recording Schemes

FIG. 8 shows scan parameters of a dot recording scheme in a first embodiment according to the present invention. In the first embodiment, the nozzle pitch k is equal to 4 dots, the number of scan repeat s is equal to 8, the number of used nozzles N is equal to 24, and the number of effective nozzles Neff is equal to 3.

The table in FIG. 8 shows parameters regarding the 1st through the 9th passes. In the specification hereof, one main scanning is referred to as the "pass". This table specifies the sub-scan feeding amount L executed immediately before each pass, the summation thereof ΣL, the offset F, the position of the pixel to be serviced, which is to be recorded (hereinafter simply referred to as the "recording position"), and the shift Δ% of the recording position.

The symbol "%i" (where i is equal to 1 to 8) used for expressing the recording position means that division of the coordinate value (an integral value starting from either 0 or 1) representing the position of the pixel on a raster line by the number of scan repeat s gives a remainder i. Eight different pixel positions %1 through %8 periodically appear on each raster line. The pixel position "%8" (this means that the remainder is 8) is equivalent to the pixel position "%0" (this means that the remainder is 0) when s=8. In general, the pixel position "%i" is equivalent to another pixel position "%(i±s×n)" where s denotes the number of scan repeat and n denotes an arbitrary integer. Here two pixel positions are "equivalent" when they are of the same type among the s different types of pixel positions.

The positional shift Δ% shown in the lower-most row in the table of FIG. 8 represents the difference between the recording position on a current pass and the recording position on a previous pass immediately before the current pass. The shift Δ% is fixed to a constant value, 3 dots, with respect to the 2nd through the 8th passes. On the 9th path, the shift Δ% is equal to 6 dots. The parameters on and after the 10th passes are omitted from the table.

As described above, the pixel position "%i" is equivalent to another pixel position "%(i±s×n)" where n is an arbitrary integer. Moving of the recording position by Δ% in the main scanning direction therefore includes the case of moving the recording position by {Δ%±(s×n)}. In a concrete example, when the number of scan repeat s is equal to 8, the expression of "moving the recording position by 3 dots in the main scanning direction" is not restricted to the case of moving the recording position by +3 dots, but includes the cases of moving the recording position, for example, by +11 dots or by −5 dots.

In the first embodiment, the number of passes in one cycle of scans is equal to 32 (=k×s) (refer to FIG. 6 for the meaning of "1 cycle"). The number of passes in a small cycle is equal to 4 (=k). The small cycle is repeated eight times (or s times) to constitute one cycle of scans. In FIG. 8, only two small cycles are shown.

In the specification hereof, the "pixel" or the "pixel position" means a place where one dot is formed. One dot may be formed by one or a plurality of droplets of the same ink. Hence, in this specification, the place where one dot is formed is referred to as the "pixel" or the "pixel position", irrespective of the number of ink droplets to form one dot.

FIG. 9 shows raster line numbers serviced by the respective nozzles on each pass in the first embodiment. The second upper-most row in FIG. 9 shows the recording positions on the respective passes, and the third row shows the shift Δ% thereof. The left-most column gives the nozzle numbers #1 through #24, and its right side shows the raster line numbers of the effective raster lines, which are to be serviced by these nozzles on the 1st through the 32nd passes. For example, on the 1st pass, the nozzle #24 records a dot at the pixel position %1 on the 3rd effective raster line. On the 2nd pass, the nozzles #23 and #24 record dots at the pixel position %4 on the 2nd and the 6th effective raster lines, respectively. Here the "effective raster lines" denote raster lines included in an effective recording area.

The shift Δ% is equal to 6 dots with respect to the 9th, the 17th, and the 25th passes, and is equal to 3 dots with respect to all the other passes. In other words, the shift Δ% on seven consecutive passes is equal to 3 dots, whereas the shift Δ% on one subsequent pass is equal to 6 dots. Advantages of this setting of the shift will be discussed later.

FIGS. 10(A)–10(H) show the shift of the recording positions in the first embodiment. FIGS. 10(A) through 10(H) respectively show the recording positions on the 1$^{st}$ through the 8$^{th}$ passes.

In FIGS. 10(A) through 10(H), the raster numbers on the left-most column show the positions of the raster lines in the effective recording area. The upper-most row shows the eight different pixel positions %1 through %8. The solid circles denote the recording positions on the current pass, and the double circles denote the recording positions on the previous pass immediately before the current pass. The open circles denote the recording positions on the passes before the previous pass.

As clearly seen from these drawings, on the 2nd through the 8th passes in the first embodiment, the pixel position to be serviced is shifted by 3 dots on every pass. Namely the recording positions are not adjacent to each other, but separated from each other, on any two consecutive passes, though the raster lines to be serviced are adjacent to each other.

As described above, the arrangement of the first embodiment adjusts the recording position on each pass to prevent the recording position on each pass from being adjacent to that on a previous adjoining pass. The dot recording scheme of the first embodiment thus advantageously reduces the possibility of ink blot or dot density deviation due to the adjacency of the recording positions on any two consecutive passes.

As shown in FIG. 9, in the first embodiment, the shift Δ% of the recording position is equal to 3 dots on seven consecutive passes and equal to 6 dots on one subsequent pass. The array of these eight shifts appears in a repeated manner. Since the shift Δ% has an identical value on most passes in the first embodiment, the recording position is shifted in a substantially regular manner as shown in FIG. 10. The substantially regular shift of the recording position is expected to improve the image quality.

In general, it is preferable to set a predetermined constant value to the shift Δ% on (s−1) consecutive passes where s denotes the number of scan repeat. In order to prevent the recording positions from being adjacent to each other on any two consecutive passes, it is desirable to set the shift Δ% on each pass in a range of at least 2 dots and at most (s−2) dots. Even if the raster lines to be serviced by two consecutive passes adjoin to each other, this arrangement prevents the recording pixel positions to adjoin to each other. It is further preferable to set the shift Δ% on (s−1) consecutive passes equal to an integer which is prime to the number of scan repeat s. This enables the shift Δ% on (s−1) consecutive passes to be readily set to a fixed value. The expression "integers A and B are prime to each other" means that the integers A and B do not have any common integral divisors other than 1.

FIG. 11 shows scan parameters in a comparative example. The difference from the first embodiment shown in FIG. 8 is only the recording position and its shift Δ%, and the other parameters in the comparative example are the sama as those in the first embodiment. In this comparative example, the shift Δ% is equal to 1 dot on each of the 2nd through the 8th passes.

FIGS. 12(A)–12(H) show the shift of the recording positions in the comparative example. As shown in FIGS. 12(A)–12(H), the recording position is shifted by one dot on each pass in this comparative example, and the recording positions on two consecutive passes are obliquely in contact with each other consequently. When ink of the dots placed on the previous pass are not sufficiently dried, this arrangement may cause ink blot or of dot density deviation, thereby deteriorating the image quality. The arrangement of the first embodiment, on the other hand, does not allow the recording positions on any two consecutive passes to be adjacent to each other, thereby advantageously reducing the possibility of ink blot or dot density deviation.

In the above description, the expression "the recording positions on any two consecutive passes do not adjoin to each other" relates to the recording positions with respect to an identical ink. Namely the recording positions on two consecutive passes may be adjacent to each other with respect to different inks.

FIG. 13 shows scan parameters in a second embodiment according to the present invention. The difference from the first embodiment shown in FIG. 8 is only the recording position and its shift $\Delta\%$, and the other parameters in the second embodiment are the same as those in the first embodiment. In the second embodiment, the shift $\Delta\%$ varies as 3, 4, 3, 3, 4, 3, and 2 dots. This frequent change is a significantly difference from the first embodiment.

FIGS. 14(A)–14(H) show the shift of the recording positions in the second embodiment. Although the shift $\Delta\%$ frequently changes in this second embodiment, the shift $\Delta\%$ is neither equal to 1 dot nor –1 dot. The "shift $\Delta\%$ equal to –1 dot" is equivalent to the shift $\Delta\%$ equal to (s–1) dots. Like the first embodiment, the arrangement of the second embodiment sets the shift $\Delta\%$ in the range of at least 2 dots and at most (s–2) dots. The restriction of the shift $\Delta\%$ within this range effectively prevents the recording pixel positions from being adjacent to each other, even if the raster lines to be recorded by two consecutive passes adjoin to each other. The arrangement of the second embodiment thus advantageously reduces the possibility of ink blot or dot density deviation due to the adjacency of the recording positions.

The dot recording scheme of the first embodiment, which sets a fixed value to the shift $\Delta\%$ of the recording position on (S–1) consecutive passes, attains the more regular shift of the recording position, compared with the dot recording scheme of the second embodiment that frequently changes the shift $\Delta\%$. The more regular shift of the first embodiment has a greater possibility of improving the image quality.

FIG. 15 shows scan parameters in a third embodiment according to the present invention. In the third embodiment, the nozzle pitch k is equal to 6 dots, the number of scan repeat s is equal to 8, the number of used nozzles N is equal to 40, and the number of effective nozzles Neff is equal to 5.

The table in FIG. 15 shows parameters regarding the 1st through the 13th passes. The shift $\Delta\%$ of the recording position is fixed to 3 dots with respect to the 2nd through the 8th passes. On the 9th path, the shift $\Delta\%$ is equal to 6 dots. The shift $\Delta\%$ is also set to the fixed value of 3 dots on the 10th to the 13th passes. The parameters on and after the 14th passes are omitted from the table.

FIG. 16 shows raster line numbers serviced by the respective nozzles on each pass in the third embodiment. The shift $\Delta\%$ is equal to 6 dots with respect to the 9th, the 17th, and the 25th passes, and is equal to 3 dots with respect to all the other passes. Like the first embodiment, in the third embodiment, the shift $\Delta\%$ on (s–1) consecutive passes is equal to a fixed value of 3 dots, whereas the shift $\Delta\%$ on one subsequent pass is equal to 6 dots. The shift $\Delta\%$ on each pass is set in the range of at least 2 dots and at most (s–2) dots.

FIGS. 17(A)–17(H) show the shift of the recording positions in the third embodiment. As mentioned above, the shift $\Delta\%$ on each pass is in the range of at least 2 dots and at most (s–2) dots in the third embodiment. This arrangement effectively prevents the recording positions on any two consecutive passes from being adjacent to each other and thereby improves the image quality. Since the shift $\Delta\%$ on seven consecutive passes is fixed to a constant value of 3 dots, the recording position changes in a relatively regular manner and the image quality is improved accordingly.

D. Modifications (1) It is preferable to set the number of scan repeat s to be at least 5 dots. This enables the shift $\Delta\%$ on each pass to be set in the range of at least 2 dots and at most (s–2) dots. This is explained as follows. In general, the value of the shift $\Delta\%$ is equivalent to another value $\{\Delta\%\pm(s\times n)\}$, which is obtained by adding or subtracting an integral multiple of the number of scan repeat s to or from the shift $\Delta\%$. The shift $\Delta\%$ in the range of at least 2 dots and at most (s–2) dots under the condition of s=4 is accordingly equivalent to a constant shift $\Delta\%$ of 2 dots. Setting the shift $\Delta\%$ equal to 2 dots on all the passes, however, causes only either the even pixel positions or the odd pixel positions to be serviced on each raster line. It is accordingly preferable to set the number of scan repeat s to be at least 5 dots.

(2) In the embodiments described above, the shift $\Delta\%$ on each pass is set in the range of at least 2 dots and at most (s–2) dots. In some cases, however, the shift $\Delta\%$ may be set equal to a value out of this range. In the case where the raster lines to be recorded by two consecutive passes do not adjoin to each other, the shift $\Delta\%$ may be set out of this range. The arrangement of setting the shift $\Delta\%$ on every pass in the range of at least 2 dots and at most (s–2) dots, however, advantageously prevents the recording pixel positions from being adjacent to each other on two consecutive passes, even if the raster lines to be recorded by the two consecutive passes adjoin to each other.

(3) In some dot recording apparatuses or printers, the dot pitch (that is, the recording resolution) in the main scanning direction may be set different from the dot pitch in the sub-scanning direction. In this case, parameters relating to the main scanning direction (for example, the shift $\Delta\%$ of the recording position) are defined by the dot pitch in the main scanning direction while other parameters relating to the sub-scanning direction (for example, the nozzle pitch k and the sub-scan feed amount L) are defined by the dot pitch in the sub-scanning direction. For example, the shift $\Delta\%$ is set equal to m times the dot pitch in the main scanning direction, where the integer m is selected with respect to each pass in the range of at least 2 and at most (s–2).

(4) The present invention is applicable to the monochromatic printing as well as to the color printing. The present invention is also applicable to drum scan printers. In the drum scan printer, the direction of the drum rotation corresponds to the main scanning direction, and the direction of the carriage shift corresponds to the sub-scanning direction. The present invention is applicable not only to the ink jet printer but generally to any dot recording apparatus that carries out recording on the surface of a printing medium with a print head having a plurality of arrays of dot-forming elements. The "dot-forming elements" here denote elements for forming dots, for example, ink nozzles in the ink jet printer. Examples of such dot recording apparatus include facsimiles and copying machines.

(5) Part of the hardware configuration in the above embodiments may be replaced by software configuration. On the contrary, part of the software configuration may be replaced by hardware configuration. For example, the functions of the control circuit 40 of the color printer 22 (see FIG. 2) may be executed by the computer 90. In this case, a computer program like the printer driver 96 performs the same functions as the control executed by the control circuit 40.

The computer program that performs such functions may be stored in a computer readable medium, such as floppy disks or CD-ROMs. The computer system 90 reads the computer program from the recording medium and transfers the computer program to an internal memory or an external storage device. Alternatively the computer system 90 may receive the computer program transmitted from a program supply apparatus via a communication path. A microprocessor in the computer system 90 executes the computer program stored in the internal memory to attain the functions of the computer program. Alternatively the computer system 90 may directly execute the computer program stored on the recording medium.

In the specification hereof, the computer system 90 includes both the hardware and the operating system, and represents the hardware working under the control of the operating system. The computer program causes the computer system 90 to attain the functions discussed above. Part of these functions may be attained by the operating system, in place of the application program.

In the present invention, "the computer readable medium" is not restricted to the portable recording media, such as flexible disks and CD-ROMS, but includes internal memory incorporated in the computer like a variety of RAMs and ROMs and external storage devices fixed to the computer like hard disks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dot recording apparatus for recording dots on a surface of a printing medium, the dot recording apparatus comprising:
    a dot print head having a plurality of dot-forming elements for forming dots of an identical color on a plurality of main scanning lines during one pass of main scan on the surface of the printing medium;
    a main scan driving section that drives at least one of the dot print head and the printing medium to carry out the main scan;
    a head driving section that drives at least part of the plurality of dot-forming elements in the course of the main scan to form dots;
    a sub-scan driving section that drives at least one of the dot print head and the printing medium to carry out sub-scan; and
    a controller that controls the respective sections;
    wherein the controller sets dot recording positions on each pass of main scan so that the dot recording positions for the identical color appear once every s dots in a main scanning direction on each raster line where s is an integer of at least 5; and
    the controller sets a sub-scan feed amount after each pass and the dot recording positions on each pass of the main scan so that the dot recording positions on any two consecutive passes are separated from each other.

2. A dot recording apparatus in accordance with claim 1, wherein the controller adjusts the recording positions in such a manner that the recording positions with respect to at least (s−1) passes among s consecutive passes are shifted by a fixed amount in the main scanning direction on each pass.

3. A dot recording apparatus in accordance with claim 2, wherein the fixed amount of the shift of the recording positions on each pass is m times a dot pitch in the main scanning direction where m is an integer selected for each pass within a range of at least 2 and at most (s−2).

4. A dot recording apparatus in accordance with claim 3, wherein the integer m defining the fixed amount of the shift for the (s−1) passes are prime to the integer s.

5. A method of recording dots on a surface of a printing medium during each pass of main scan, comprising the steps of:
    executing main scan to form dots on the surface of the printing medium;
    executing sub-scan after each pass of the main scan; and
    repeating the main scan and the sub-scan to complete the recording;
    wherein recording positions on each pass of main scan are set so that the dot recording positions for an identical color appear once every s dots in a main scanning direction on each raster line where s is an integer of at least 5; and
    a sub-scan feed amount after each pass and the dot recording positions on each pass of the main scan are set so that the dot recording positions on any two consecutive passes are separated from each other.

6. A dot recording method in accordance with claim 5, wherein the recording positions are determined in such a manner that the recording positions with respect to at least (s−1) passes among s consecutive passes are shifted by a fixed amount in the main scanning direction on each pass.

7. A dot recording method in accordance with claim 6, wherein the fixed amount of the shift of the recording positions on each pass is m times a dot pitch in the main scanning direction where m is an integer selected for each pass within a range of at least 2 and at most (s−2).

8. A dot recording method in accordance with claim 7, wherein the integer m defining the fixed amount of the shift for the (s−1) passes are prime to the integer s.

9. A computer program product storing a computer program for causing a computer to produce print data to be supplied to a printer, the computer program product comprising:
    a computer readable medium; and
    a computer program stored on the computer readable medium;
    wherein the computer program causes a computer to produce the print data;
    wherein the print data represents dot recording positions on each pass of main scan so that the dot recording positions for an identical color appear once every s dots in a main scanning direction on each raster line where s is an integer of at least 5; and
    wherein the print data represents a sub-scan feed amount after each pass and the dot recording positions on each pass of the main scan so that the dot recording positions on any two consecutive passes are separated from each other.

10. A computer program product in accordance with claim 9, wherein the recording positions are determined in such a manner that the recording positions with respect to at least (s−1) passes among s consecutive passes are shifted by a fixed amount in the main scanning direction on each pass.

11. A computer program product in accordance with claim 10, wherein the fixed amount of the shift of the recording positions on each pass is m times a dot pitch in the main scanning direction where m is an integer selected for each pass within a range of at least 2 and at most (s−2).

12. A computer program product in accordance with claim 11, wherein the integer m defining the fixed amount of the shift for the (s−1) passes are prime to the integer s.

* * * * *